N. F. McEVOY.
Folding-Mirror.

No. 220,853.  Patented Oct. 21, 1879.

WITNESSES;
Edward H. Hill.
James Greene.

INVENTOR;
N. F. McEvoy.
BY HIS ATT'Y., James J. Arnold

UNITED STATES PATENT OFFICE.

NICHOLAS F. McEVOY, (CATHERINE McEVOY, ADMINISTRATRIX,) OF MILLBURY, MASSACHUSETTS.

IMPROVEMENT IN FOLDING MIRRORS.

Specification forming part of Letters Patent No. 220,853, dated October 21, 1879; application filed August 2, 1877.

*To all whom it may concern:*

Be it known that I, N. F. McEVOY, of Millbury, in the county of Worcester and State of Massachusetts, have invented an Improvement in Folding Mirrors; and I do hereby declare that the following is a full, clear, and exact description of the same.

Two or more mirrors have been mounted upon a standard and adapted to be placed in different positions or at different angles to each other. The present invention is an improvement in that class; and it consists in the construction and combination of parts, as hereinafter described and claimed.

Figure 1:
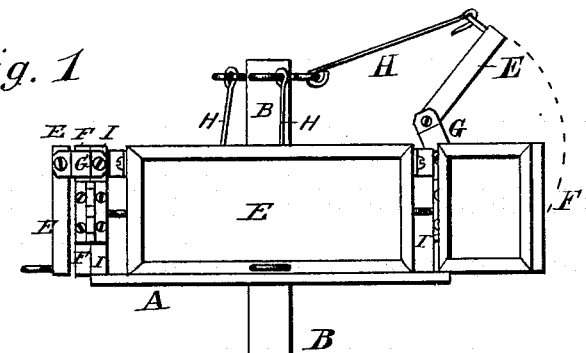
Figure 3:
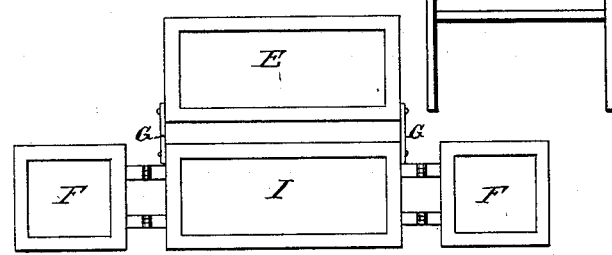
Figure 2:
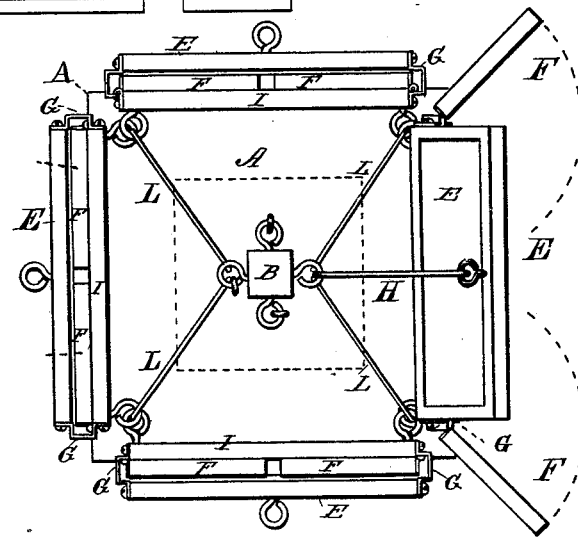

In the accompanying drawings, forming part of this specification, Figure 1 is a side view, and Fig. 2 a top view, of a stand having mirrors attached thereto according to the present invention. Fig. 3 is a front view, showing a set of mirrors open.

A indicates a revolving rectangular head or plate mounted on the standard B, which rotates in the base C.

Four sets of folding mirrors are attached to the head A, one set being placed on each side thereof. Each set consists of a stationary mirror, I, and three folding mirrors, E F F, which are hinged thereto—that is to say, the mirror I is fixed vertically on the edge of head A, and braced by rods L, which extend to the post or standard B.

The mirrors E are hinged to the ends of mirror I and fold inward against the latter, being less than half its length.

The mirror E, which is of the same dimensions as the stationary one, I, is hinged to the upper portion of the latter by means of arms G, so that it may be folded down over and against the outer side of mirrors F F, as shown in Figs. 1 and 2.

The set of mirrors on the right-hand side of head A are represented open, while the others are shown closed.

When it is desired to use the mirrors the mirror E is raised and secured by a long hook, H, at an inclination of about forty-five degrees to the mirror I, and the mirrors F F are swung laterally or outward into about the same angle. A person standing before the mirror I will see a front view of his face reflected therein, while the lateral mirrors F F will reflect side views of the same, and the upper mirror, E, will reflect his person foreshortened. Thus four different views will be had simultaneously.

All four sets of mirrors may be in use at once, if required. When but one set is in use the mirrors may be placed in the most advantageous light, owing to the adaptation of the post B to revolve.

The invention is adapted for use in ladies' or gentlemen's dressing-rooms, and particularly so for clothing and millinery shops, or wherever else it is requisite to arrange clothing or inspect its fit, &c.

What I claim is—

The combination, with the stationary mirror I, of the laterally-folding mirrors F F and the mirror E, which is hinged above the former, and adapted to fold down over the mirrors F F, as shown and described.

In testimony whereof I have hereunto set my hand this 28th of the seventh month, A. D. 1877.

NICHOLAS FRANCES McEVOY.

Witnesses:
 JAMES GREENE,
 JAMES G. ARNOLD.